US012394929B2

(12) United States Patent
Huang et al.

(10) Patent No.: US 12,394,929 B2
(45) Date of Patent: Aug. 19, 2025

(54) ELECTRICAL CONNECTOR WITH PLURAL TERMINALS

(71) Applicant: ACES Electronics Co., Ltd., Taoyuan (TW)

(72) Inventors: Kuo Hua Huang, Taoyuan (TW); Cheng Hsiang Hsueh, Taoyuan (TW); I Chiao Tso, Taoyuan (TW)

(73) Assignee: ACES Electronics Co., Ltd., Taoyuan (TW)

( * ) Notice: Subject to any disclaimer, the term of this patent is extended or adjusted under 35 U.S.C. 154(b) by 447 days.

(21) Appl. No.: 18/163,292

(22) Filed: Feb. 2, 2023

(65) Prior Publication Data

US 2024/0113460 A1 Apr. 4, 2024

(30) Foreign Application Priority Data

Sep. 30, 2022 (TW) ................................ 111137419

(51) Int. Cl.
*H01R 13/03* (2006.01)
*H01R 13/502* (2006.01)
*H01R 24/60* (2011.01)

(52) U.S. Cl.
CPC ........... *H01R 13/03* (2013.01); *H01R 13/502* (2013.01)

(58) Field of Classification Search
CPC .... H01R 12/716; H01R 13/03; H01R 13/502; H01R 13/6471; H01R 24/60
See application file for complete search history.

(56) References Cited

U.S. PATENT DOCUMENTS

| | | | | |
|---|---|---|---|---|
| 6,702,590 B2 * | 3/2004 | Zaderej | H01R 12/7082 439/607.05 |
| 9,570,856 B2 * | 2/2017 | Sato | H01R 12/737 |
| 2019/0131746 A1 | 5/2019 | Morgan et al. | |
| 2022/0224054 A1 * | 7/2022 | Xu | H01R 13/6471 |
| 2023/0125645 A1 * | 4/2023 | Yin | H01R 12/716 439/108 |
| 2023/0187863 A1 * | 6/2023 | Huang | H01R 12/737 439/74 |

FOREIGN PATENT DOCUMENTS

| | | |
|---|---|---|
| CN | 110190431 A | 8/2019 |
| CN | 111244686 A | 6/2020 |
| CN | 110190431 B | 1/2021 |
| CN | 212725673 U | 3/2021 |
| CN | 213212565 U | 5/2021 |
| CN | 213782402 U | 7/2021 |
| CN | 113612082 A | 11/2021 |
| TW | M560138 U | 5/2018 |

* cited by examiner

*Primary Examiner* — Abdullah A Riyami
*Assistant Examiner* — Thang H Nguyen
(74) *Attorney, Agent, or Firm* — CKC & Partners Co., LLC

(57) ABSTRACT

An electrical connector is configured to couple to a butt plug. The electrical connector includes an insulation body, plural signal terminals, plural ground terminals, and at least one conductive plastic. The insulation body has an accommodating recess. The signal terminals are located in the accommodating recess. The ground terminals are located in the accommodating recess, and the ground terminals and the signal terminals are arranged at intervals. The conductive plastic is located on a top surface of the insulation body facing the butt plug. When the butt plug is inserted into the accommodating recess of the insulation body, plural ground terminals of the butt plug are in electrical contact with the conductive plastic.

13 Claims, 7 Drawing Sheets

ELECTRICAL CONNECTOR WITH PLURAL TERMINALS

CROSS-REFERENCE TO RELATED APPLICATIONS

This application claims priority to Taiwan Application Serial Number 111137419, filed Sep. 30, 2022, which is herein incorporated by reference.

BACKGROUND

Field of Invention

The present disclosure relates to an electrical connector. More particularly, the present disclosure relates to an electrical connector having ground terminals.

Description of Related Art

To achieve electrical connection between different electronic devices, various types of electrical connectors have existed. The electrical connectors may include the type of a wire end connector and the type of a board end connector according to disposed positions, in which the wire end connector is located at one end of a cable and is used to adapt and couple to the board end connector, while the board end connector is disposed on a printed circuit board. With the continuous advancement and innovation of the technology of various electronic products, the performance of new electronic products has been greatly improved, and the types of electrical signals tend to be more diverse and require more bandwidth. Therefore, the demand for high-speed connectors is also increasing to apply to high-speed and high-frequency connections.

However, in order to meet the transmission of a large amount of data, the transmission bandwidth of the electrical connector needs to be increased, and when the transmission bandwidth is increased, the frequency of a transmitted electronic signal must be increased. In a traditional electrical connector, when signal terminals are too close to each other, high frequency signals are prone to crosstalk phenomenon, thereby affecting the transmission of the signals.

SUMMARY

One aspect of the present disclosure provides an electrical connector configured to couple to a butt plug.

According to some embodiments of the present disclosure, an electrical connector includes an insulation body, plural signal terminals, plural ground terminals, and at least one conductive plastic. The insulation body has an accommodating recess. The signal terminals are located in the accommodating recess. The ground terminals are located in the accommodating recess, and the ground terminals and the signal terminals are arranged at intervals. The conductive plastic is located on a top surface of the insulation body facing the butt plug. When the butt plug is inserted into the accommodating recess of the insulation body, plural ground terminals of the butt plug are in electrical contact with the conductive plastic.

In some embodiments, when the butt plug is inserted into the accommodating recess of the insulation body, the conductive plastic of the electrical connector is in contact with the ground terminals of the electrical connector.

In some embodiments, the conductive plastic has a main portion and a plurality of finger portions protruding from the main portion, and the finger portions respectively cover a plurality of contact portions of the ground terminals of the electrical connector.

In some embodiments, there is a distance between one end of each of the finger portions adjacent to the accommodating recess and the main portion.

In some embodiments, the main portion of the conductive plastic is disposed along a lengthwise direction of the accommodating recess of the insulation body.

In some embodiments, an extending direction of the finger portions of the conductive plastic is perpendicular to a lengthwise direction of the main portion.

In some embodiments, a distance between two adjacent ones of the finger portions of the conductive plastic is greater than a distance between two adjacent ones of the signal terminals.

In some embodiments, each of the ground terminals of the electrical connector comprises one of the contact portions, a fixed portion, and a welding portion that are connected in sequence, and the contact portions respectively correspond to the finger portions of the conductive plastic in position.

In some embodiments, when the butt plug is inserted into the accommodating recess of the insulation body, each of the contact portions is in electrical contact with one of the ground terminals of the butt plug and one of the finger portions of the conductive plastic.

In some embodiments, there is a plurality of the conductive plastics respectively located on two opposite sides of the insulation body.

Another aspect of the present disclosure provides an electrical connector configured to couple to a butt plug.

According to some embodiments of the present disclosure, an electrical connector includes an insulation body, plural signal terminals, plural ground terminals, and at least one conductive plastic. The insulation body has an accommodating recess. The signal terminals are located in the accommodating recess. The ground terminals are located in the accommodating recess, and the ground terminals and the signal terminals are arranged at intervals. The conductive plastic is located on a top surface of the insulation body facing the butt plug. When the butt plug is inserted into the accommodating recess of the insulation body, the conductive plastic of the electrical connector is in contact with the ground terminals of the electrical connector.

In some embodiments, the conductive plastic has a main portion and a plurality of finger portions protruding from the main portion, and the finger portions respectively cover a plurality of contact portions of the ground terminals of the electrical connector.

In some embodiments, there is a distance between one end of each of the finger portions adjacent to the accommodating recess and the main portion.

In some embodiments, the main portion of the conductive plastic is disposed along a lengthwise direction of the accommodating recess of the insulation body.

In some embodiments, an extending direction of the finger portions of the conductive plastic is perpendicular to a lengthwise direction of the main portion.

In the aforementioned embodiments of the present disclosure, since the electrical connector includes the conductive plastic and the conductive plastic is located on the top surface of the insulation body facing the butt plug, the ground terminals of the butt plug can be in electrical contact with the conductive plastic when the butt plug is inserted into the accommodating recess of the insulation body. Moreover, the ground terminals of the electrical connector can be respectively in electrical contact with the ground terminals of the butt plug, such that the ground terminals of the electrical connector are pressed by the ground terminals of the butt plug to be in electrical contact with the conductive plastic. Through such a configuration, when this electrical connector is coupled to the butt plug, the electrical connector can enable its ground terminals to electrically conduct with the ground terminals of the butt plug by the conductive plastic, thereby preventing the problem of crosstalk between differential signals caused by high-speed signal transmission. Therefore, the electrical connector can meet the transmission of high-frequency signals and is beneficial to improve transmission bandwidth and increase electronic signal frequency, and is suitable for a large amount of data transmission requirements.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
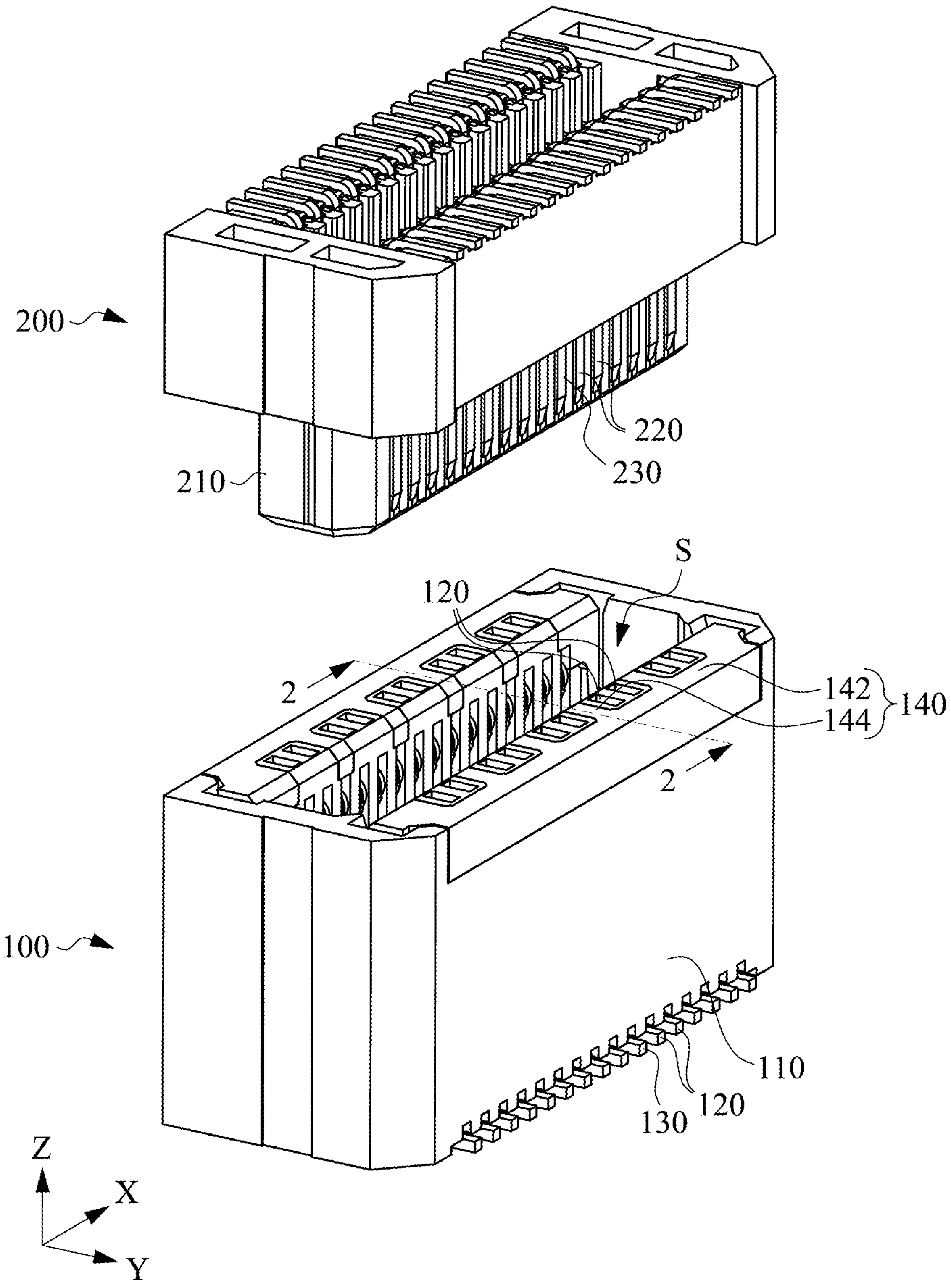
FIG. 1 is a perspective view of an electrical connector and a butt plug that are not coupled to each other yet according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
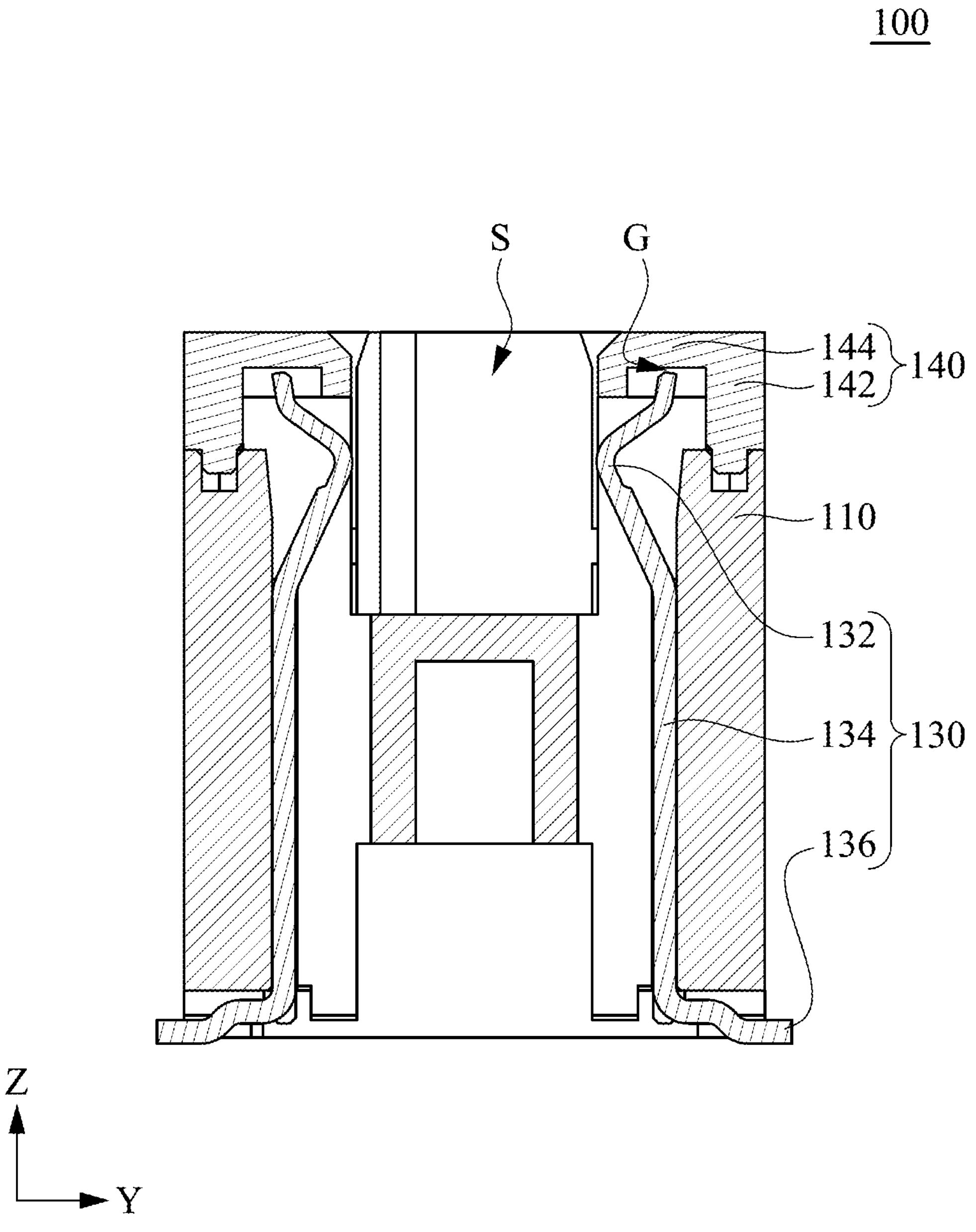
FIG. 2 is a cross-sectional view of the electrical connector taken along line 2-2 of FIG. 1.

FIG. 1 is a perspective view of an electrical connector 100 and a butt plug 200 that are not coupled to each other yet according to one embodiment of the present disclosure. FIG. 2 is a cross-sectional view of the electrical connector 100 taken along line 2-2 of FIG. 1. As shown in FIG. 1 and FIG. 2, the electrical connector 100 is configured to couple to the butt plug 200. The electrical connector 100 may be disposed on a printed circuit board to serve as a board end connector, while the butt plug 200 may be connected to a cable to serve as wire end connector. In some embodiments, the electrical connector 100 may be applied to a server and a workstation, but the present disclosure is not limited in this regard.

The electrical connector 100 includes an insulation body 110, plural signal terminals 120, plural ground terminals 130, and at least one conductive plastic 140. The insulation body 110 has an accommodating recess S capable of being inserted by a connection portion 210 of the butt plug 200. The signal terminals 120 and the ground terminals 130 are located in the accommodating recess S, and the ground terminals 130 and the signal terminals 120 are arranged at intervals, such as in a parallel arrangement along the X-axis. The ground terminal 130 of the electrical connector 100 includes a contact portion 132, a fixed portion 134, and a welding portion 136 that are connected in sequence. The conductive plastic 140 has a main portion 142 and plural finger portions 144 protruding from the main portion 142. In the Z-axis direction, the finger portions 144 of the conductive plastic 140 respectively cover the contact portions 132 of the ground terminals 130. In other words, the contact portions 132 respectively correspond to the finger portions 144 of the conductive plastic 140 in position.

In this embodiment, any two adjacent signal terminals 120 are located between two of the ground terminals 130, such as an arrangement with the order of the ground terminal 130, the signal terminal 120, the signal terminal 120, and the ground terminal 130. In such a configuration, two adjacent signal terminals 120 may be a pair of differential signal terminals.

Furthermore, in this embodiment, the conductive plastic 140 is located on a top surface (a surface facing the butt plug 200) of the insulation body 110. The number of the conductive plastics 140 may be plural, such as two. As shown in FIG. 1, the two conductive plastics 140 are disposed opposite each other, and are respectively located on two opposite sides of the insulation body 110.

In some embodiments, the material of the insulation body 110 may be plastic, and the material of the signal terminal 120 and the material of the ground terminal 130 may be metal, such as copper, but not limited to copper. The material of the conductive plastic 140 may include plastic and a conductive material doped in plastic. For example, the conductive material may be gold, silver, copper, carbon or graphite related compounds, but the present disclosure is not limited to the aforementioned materials. Through the aforementioned design, the resistance of the conductive plastic 140 is greater than the resistance of the ground terminal 130, but less than the resistance of the insulation body 110.

When the electrical connector 100 is not coupled to the butt plug 200 yet, as shown in FIG. 2, the conductive plastic 140 partially extends to a position above the ground terminal 130 and is spaced apart from the ground terminal 130. Specifically, when the contact portion 132 of the ground terminal 130 of the electrical connector 100 is not pressed by a ground terminal 230 (see FIG. 1) of the butt plug 200, there is a gap G between the finger portion 144 of the conductive plastic 140 and the contact portion 132 of the ground terminal 130 in the Z-axis direction, and thus the ground terminal 130 does not electrically conduct to the conductive plastic 140. In the following description, the state about the ground terminal 130 after the electrical connector 100 is coupled to the butt plug 200 will be described.

Figure 3:
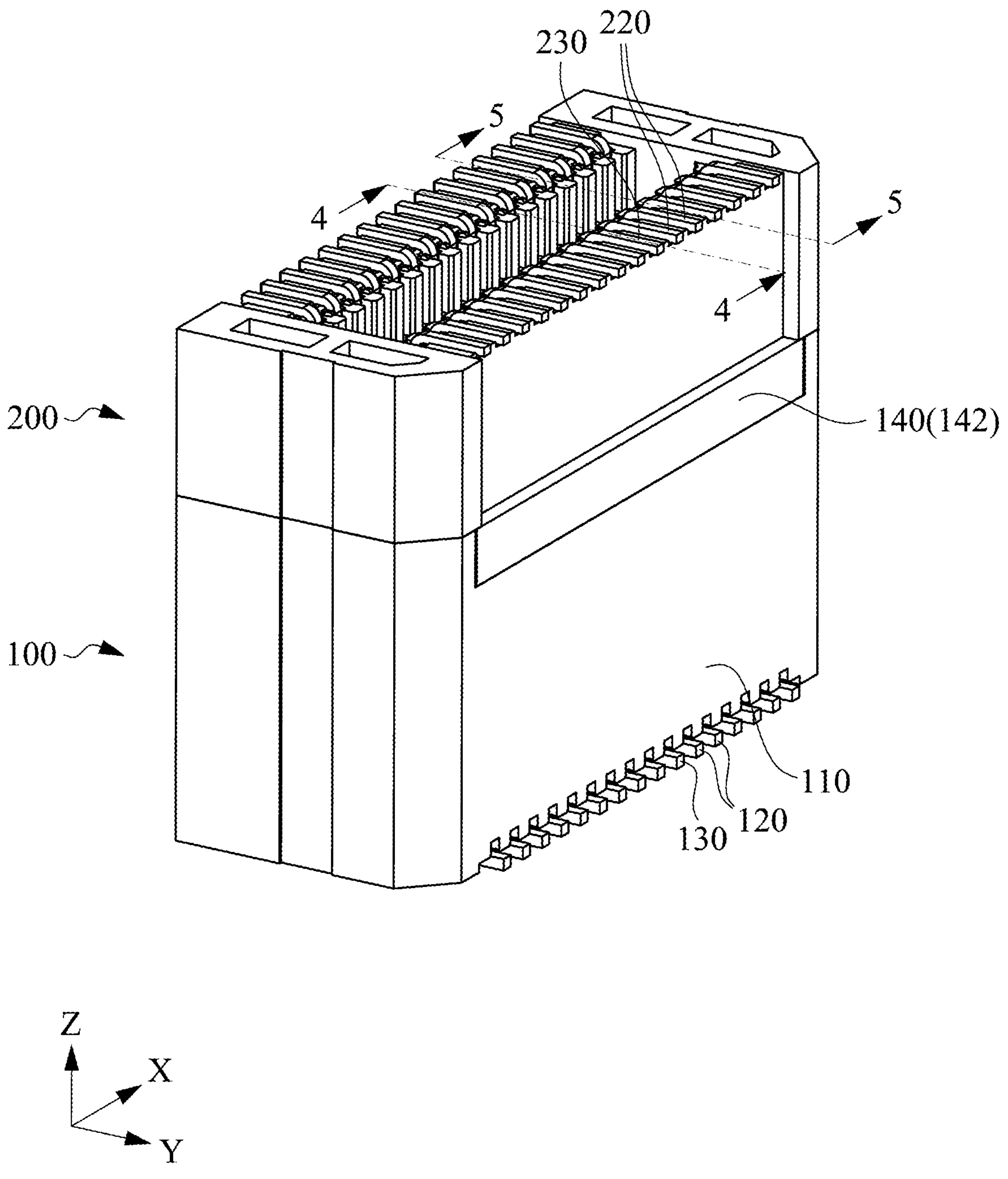
FIG. 3 is a perspective view of the electrical connector and the butt plug of FIG. 1 after being coupled to each other.

FIG. 3 is a perspective view of the electrical connector 100 and the butt plug 200 of FIG. 1 after being coupled to each other. As shown in FIG. 1 and FIG. 3, the connection portion 210 of the butt plug 200 can be inserted into the accommodating recess S of the insulation body 110 of the electrical connector 100. After the electrical connector 100 is coupled to the butt plug 200, the connection portion 210 is accommodated in the accommodating recess S of the insulation body 110. Moreover, in the accommodating recess S, the ground terminal 130 and the signal terminal 120 of the electrical connector 100 can respectively abut against the ground terminal 230 and a signal terminal 220 of the butt plug 200 to cause conduction.

Figure 4:
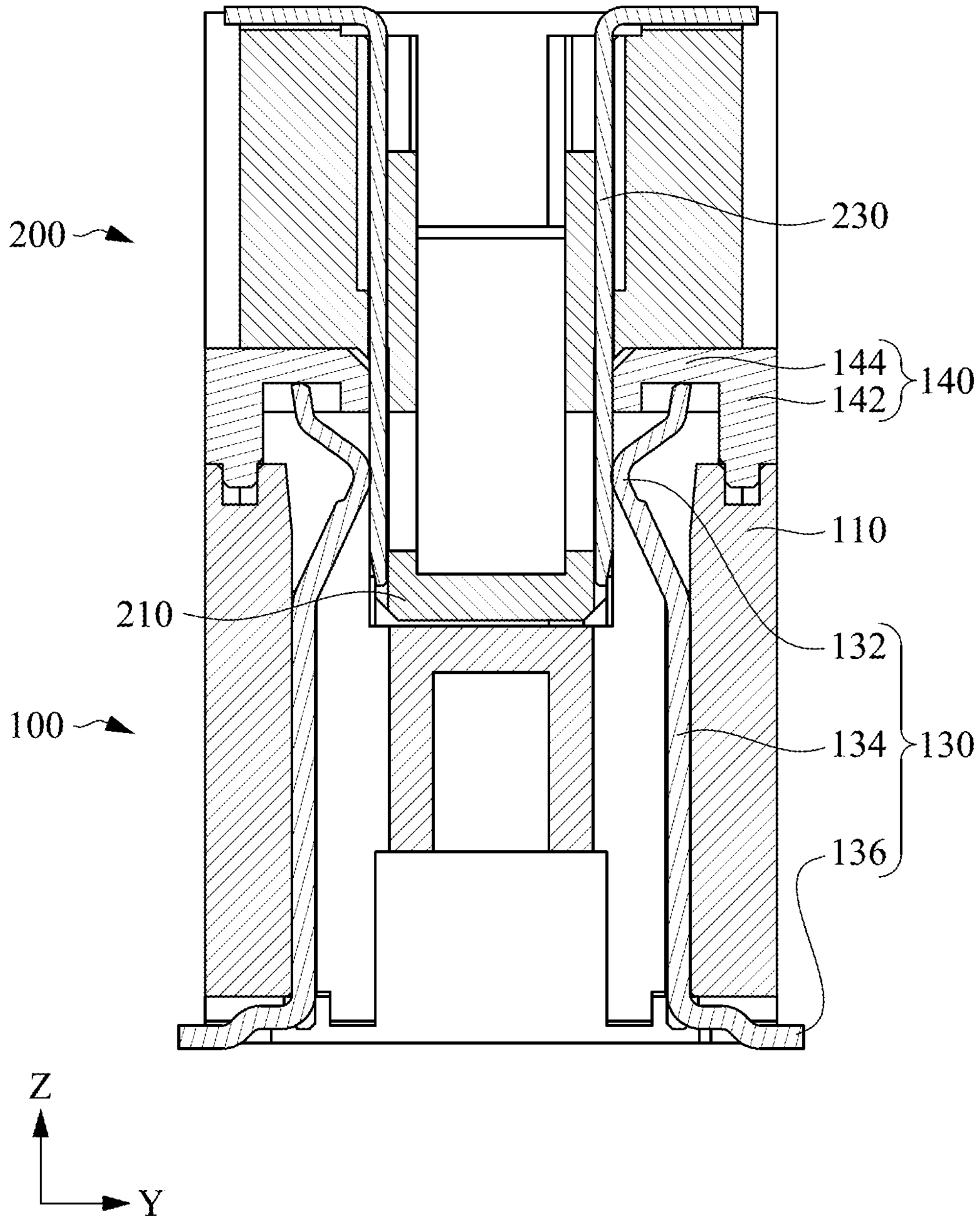
FIG. 4 is a cross-sectional view of the electrical connector and the butt plug taken along line 4-4 of FIG. 3.

FIG. 4 is a cross-sectional view of the electrical connector 100 and the butt plug 200 taken along line 4-4 of FIG. 3. For the electrical connector 100, the cross-sectional position of FIG. 4 is the same as that of FIG. 2. As shown in FIG. 3 and FIG. 4, when the butt plug 200 is coupled to the electrical connector 100, the ground terminal 230 of the butt plug 200 is in electrical contact with the conductive plastic 140, and each of the contact portions 132 of the ground terminals 130 is in electrical contact with one of the ground terminals 230 of the butt plug 200 and one of the finger portions 144 of the conductive plastic 140. The fixed portion 134 of the ground terminal 130 may be positioned on the inner sidewall of the insulation body 110, and the welding portion 136 of the ground terminal 130 may be used for being soldered on a printed circuit board.

Specifically, since the electrical connector 100 includes the conductive plastic 140 and the conductive plastic 140 is located on the top surface of the insulation body 110 facing the butt plug 200, the ground terminals 230 of the butt plug 200 can be in electrical contact with the conductive plastic 140 when the butt plug 200 is inserted into the accommodating recess S (see FIG. 1) of the insulation body 110 of the electrical connector 100. Moreover, the ground terminals 130 of the electrical connector 100 can be respectively in electrical contact with the ground terminals 230 of the butt plug 200, such that the ground terminals 130 of the electrical connector 100 are pressed by the ground terminals 230 of the butt plug 200 to be in electrical contact with the conductive plastic 140. Through such a configuration, when this electrical connector 100 is coupled to the butt plug 200, the electrical connector 100 can enable its ground terminals 130 to electrically conduct with the ground terminals 230 of the butt plug 200 by the conductive plastic 140, thereby preventing the problem of crosstalk between differential signals caused by high-speed signal transmission. Therefore, the electrical connector 100 can meet the transmission of high-frequency signals and is beneficial to improve transmission bandwidth and increase electronic signal frequency, and is suitable for a large amount of data transmission requirements.

Figure 5:
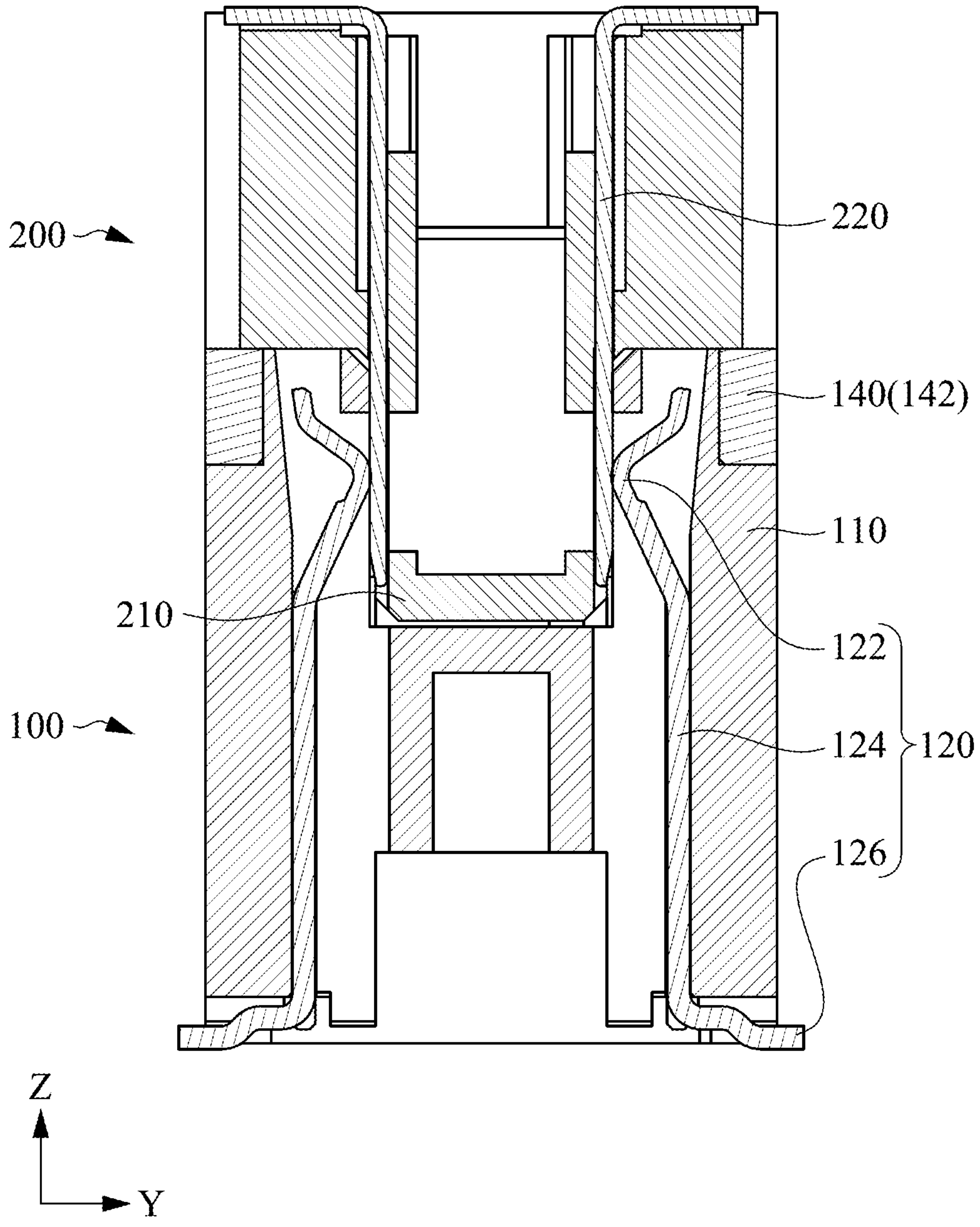
FIG. 5 is a cross-sectional view of the electrical connector and the butt plug taken along line 5-5 of FIG. 3.

FIG. 5 is a cross-sectional view of the electrical connector 100 and the butt plug 200 taken along line 5-5 of FIG. 3. As shown in FIG. 1 and FIG. 5, the signal terminal 120 of the electrical connector 100 includes a contact portion 122, a fixed portion 124, and a welding portion 126 that are connected in sequence. When the butt plug 200 is inserted into the accommodating recess S of the insulation body 110 of the electrical connector 100, the contact portion 122 of the signal terminal 120 is exposed and not covered by the conductive plastic 140 in the Z-axis direction, and the contact portion 122 of the signal terminal 120 is adjacent to the finger portion 144 of the conductive plastic 140. In addition, the fixed portion 124 of the signal terminal 120 of the electrical connector 100 may be positioned on the inner sidewall of the insulation body 110, and the welding portion 126 of the signal terminal 120 may be used for being soldered on a printed circuit board.

As shown in FIG. 3 and FIG. 5, when the butt plug 200 is inserted into the accommodating recess S (see FIG. 1) of the insulation body 110 of the electrical connector 100, the signal terminals 120 of the electrical connector 100 can be respectively electrically connected to the signal terminals 220 of the butt plug 200 to transmit signals. In this state, the contact portion 122 of the signal terminal 120 of the electrical connector 100 may be in contact with the signal terminal 220 of the butt plug 200 to cause conduction, but the signal terminal 120 of the electrical connector 100 is spaced apart from the conductive plastic 140.

It is to be noted that the connection relationships, the materials, and the advantages of the elements described above will not be repeated in the following description. In the following description, the ground terminals 130 and the conductive plastic 140 of the electrical connector 100 will be explained in detail.

Figure 6:
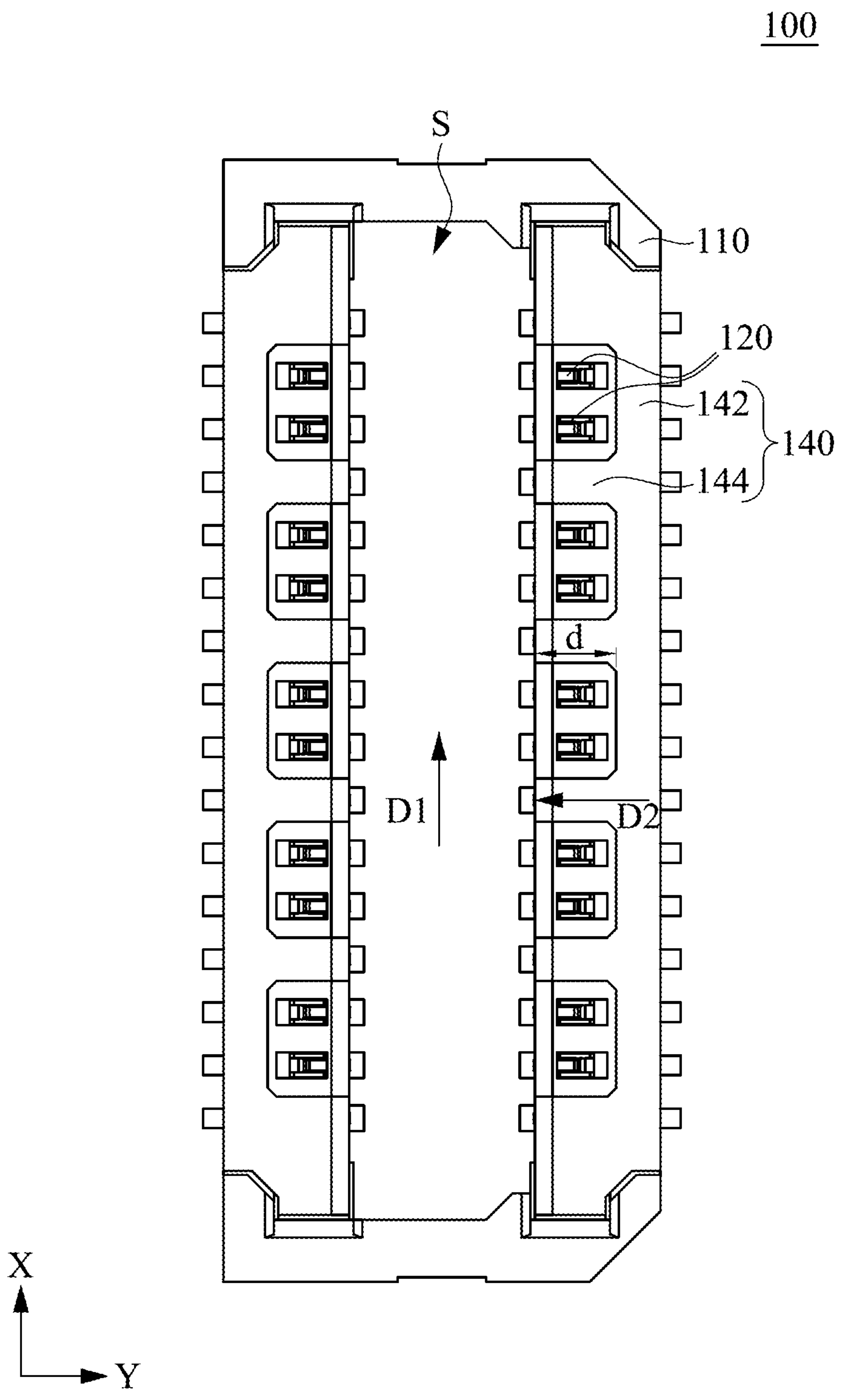
FIG. 6 is a top view of the electrical connector of FIG. 1.
Figure 7:
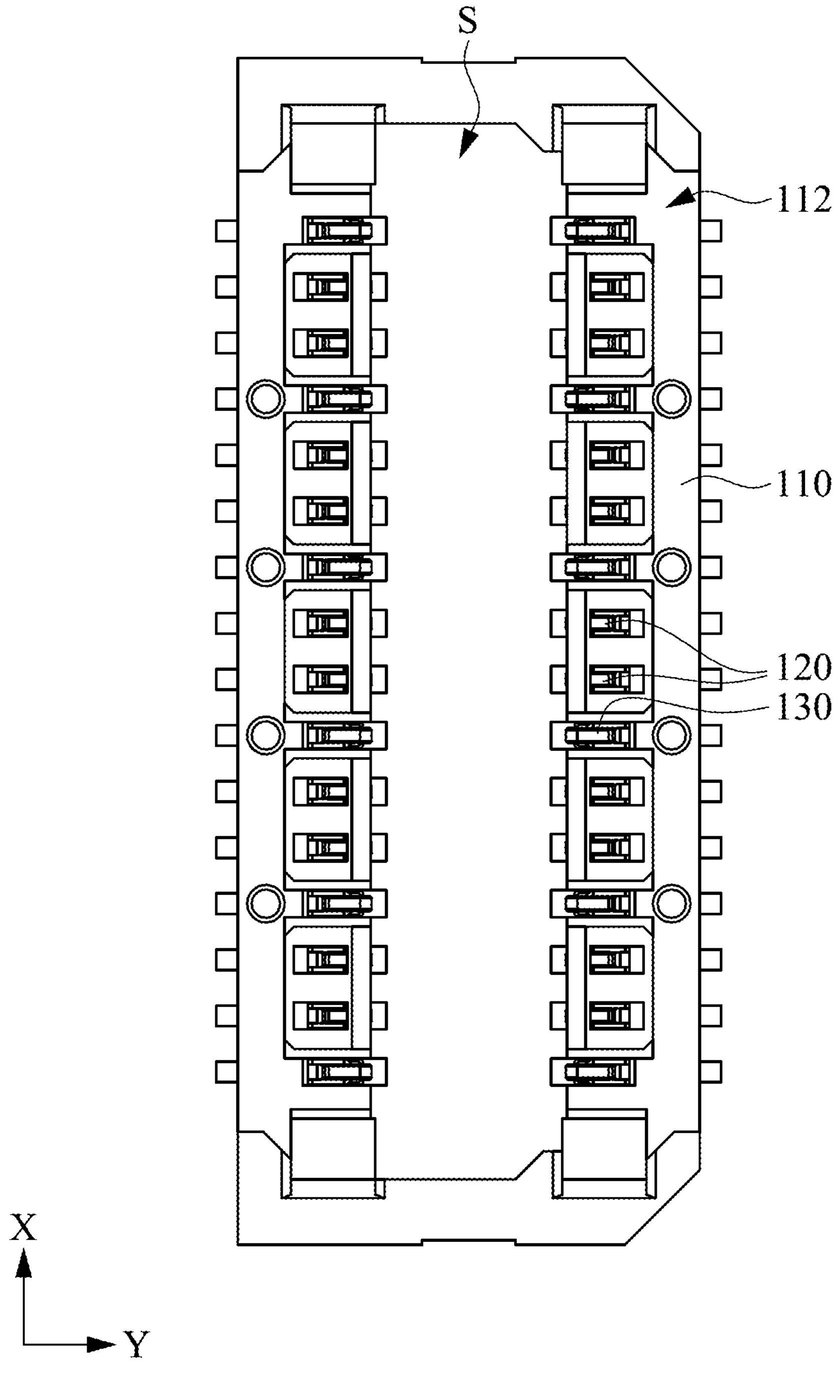
FIG. 7 is a top view of the electrical connector of FIG. 6 after a conductive plastic is removed.

FIG. 6 is a top view of the electrical connector 100 of FIG. 1. FIG. 7 is a top view of the electrical connector 100 of FIG. 6 after the conductive plastic 140 is removed. As shown in FIG. 6 and FIG. 7, the conductive plastic 140 is located on a top surface 112 of the insulation body 110, and the top surface 112 of the insulation body 110 faces toward the butt plug 200 (see FIG. 1). There is a distance d between one end of the finger portion 144 adjacent to the accommodating recess S and the main portion 142. In other words, the finger portion 144 extends outward from the main portion 142 to the accommodating recess S. The main portion 142 of the conductive plastic 140 is disposed along a lengthwise direction D1 of the accommodating recess S of the insulation body 110. In this embodiment, an extending direction D2 of the finger portions 144 of the conductive plastic 140 is perpendicular to the lengthwise direction D1 of the main portion 142, and the finger portions 144 are configured to cover the ground terminals 130.

In addition, a distance between two adjacent finger portions 144 of the conductive plastic 140 is greater than a distance between two adjacent signal terminals 120. Such a configuration can ensure that the finger portions 144 of the conductive plastic 140 do not overlap the two adjacent signal terminals 120 in the Z-axis direction (see FIG. 5) such that the two adjacent signal terminals 120 can be exposed, thereby preventing structural interference.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electrical connector, configured to couple to a butt plug, and the electrical connector comprising:
   - an insulation body having an accommodating recess;
   - a plurality of signal terminals located in the accommodating recess;

a plurality of ground terminals located in the accommodating recess, wherein the ground terminals and the signal terminals are arranged at intervals; and at least one conductive plastic located on a top surface of the insulation body facing the butt plug, wherein the conductive plastic has a main portion and a plurality of finger portions protruding from the main portion, and the finger portions respectively cover a plurality of contact portions of the ground terminals of the electrical connector, and when the butt plug is inserted into the accommodating recess of the insulation body, a plurality of ground terminals of the butt plug are in electrical contact with the conductive plastic.

2. The electrical connector of claim 1, wherein when the butt plug is inserted into the accommodating recess of the insulation body, the conductive plastic of the electrical connector is in contact with the ground terminals of the electrical connector.

3. The electrical connector of claim 1, wherein there is a distance between one end of each of the finger portions adjacent to the accommodating recess and the main portion.

4. The electrical connector of claim 1, wherein the main portion of the conductive plastic is disposed along a lengthwise direction of the accommodating recess of the insulation body.

5. The electrical connector of claim 1, wherein an extending direction of the finger portions of the conductive plastic is perpendicular to a lengthwise direction of the main portion.

6. The electrical connector of claim 1, wherein a distance between two adjacent ones of the finger portions of the conductive plastic is greater than a distance between two adjacent ones of the signal terminals.

7. The electrical connector of claim 1, wherein each of the ground terminals of the electrical connector comprises one of the contact portions, a fixed portion, and a welding portion that are connected in sequence, and the contact portions respectively correspond to the finger portions of the conductive plastic in position.

8. The electrical connector of claim 7, wherein when the butt plug is inserted into the accommodating recess of the insulation body, each of the contact portions is in electrical contact with one of the ground terminals of the butt plug and one of the finger portions of the conductive plastic.

9. The electrical connector of claim 1, wherein there is a plurality of the conductive plastics respectively located on two opposite sides of the insulation body.

10. An electrical connector, configured to couple to a butt plug, and the electrical connector comprising:

an insulation body having an accommodating recess;

a plurality of signal terminals located in the accommodating recess;

a plurality of ground terminals located in the accommodating recess, wherein the ground terminals and the signal terminals are arranged at intervals; and at least one conductive plastic located on a top surface of the insulation body facing the butt plug, wherein the conductive plastic has a main portion and a plurality of finger portions protruding from the main portion, and the finger portions respectively cover a plurality of contact portions of the ground terminals of the electrical connector, and when the butt plug is inserted into the accommodating recess of the insulation body, the conductive plastic of the electrical connector is in contact with the ground terminals of the electrical connector.

11. The electrical connector of claim 10, wherein there is a distance between one end of each of the finger portions adjacent to the accommodating recess and the main portion.

12. The electrical connector of claim 10, wherein the main portion of the conductive plastic is disposed along a lengthwise direction of the accommodating recess of the insulation body.

13. The electrical connector of claim 10, wherein an extending direction of the finger portions of the conductive plastic is perpendicular to a lengthwise direction of the main portion.

* * * * *